United States Patent [19]
Köhler

[11] Patent Number: 6,080,233
[45] Date of Patent: Jun. 27, 2000

[54] COBALT-CONTAINING IRON OXIDE PIGMENTS, PROCESS FOR PRODUCING THE SAME AND MAGNETIC RECORDING MEDIUM CONTAINING THE SAME

[75] Inventor: Berndt-Ullrich Köhler, Krefeld, Germany

[73] Assignee: Toda Kogyo Corporation, Japan

[21] Appl. No.: 08/260,447

[22] Filed: Jun. 14, 1994

[30] Foreign Application Priority Data

Jun. 14, 1993 [DE] Germany .............................. 43 19 572

[51] Int. Cl.$^7$ .............................. C04B 35/32; G11B 5/706
[52] U.S. Cl. .................. 106/456; 106/459; 252/62.51 C; 252/62.5 C; 252/62.58; 252/62.59; 252/62.62; 252/62.63; 252/62.64; 428/694 B; 428/692; 428/403
[58] Field of Search ..................... 106/456, 459; 252/62.5 C, 62.59, 62.58, 62.62, 62.64, 62.63, 62.51 C; 428/694 B, 692, 403

[56] References Cited

U.S. PATENT DOCUMENTS

| | | | |
|---|---|---|---|
| 3,573,980 | 4/1971 | Haller et al. | 252/62.56 |
| 3,725,126 | 4/1973 | Haller et al. | 252/62.56 |
| 3,748,270 | 7/1973 | Hwang | 252/62.56 |
| 3,897,354 | 7/1975 | Woditsch et al. | 252/62.56 |
| 3,953,656 | 4/1976 | Tokuoka et al. | 252/62.56 |
| 3,977,985 | 8/1976 | Umeki et al. | 252/62.55 |
| 4,010,310 | 3/1977 | Kubota et al. | 427/403 |
| 4,066,565 | 1/1978 | Sasazawa et al. | 252/62.56 |
| 4,122,216 | 10/1978 | Okazoe | 427/128 |
| 4,224,175 | 9/1980 | Montino et al. | 252/62.56 |
| 4,297,395 | 10/1981 | Buxbaum et al. | 427/127 |
| 4,321,302 | 3/1982 | Umeki et al. | 428/404 |
| 4,551,327 | 11/1985 | Honma et al. | 423/594 |
| 4,631,140 | 12/1986 | Steck et al. | 427/128 |
| 4,933,014 | 6/1990 | Kathrein et al. | 106/459 |
| 5,116,419 | 5/1992 | Kathrein et al. | 106/459 |

FOREIGN PATENT DOCUMENTS

| | | |
|---|---|---|
| 0376033 | 7/1990 | European Pat. Off. . |
| 3 017 652 | 11/1980 | Germany . |
| 3017525 | 11/1980 | Germany . |
| 3 101 834 | 3/1982 | Germany . |
| 4128563A1 | 3/1993 | Germany . |
| 55-72009 | 5/1980 | Japan . |
| 60-93629 | 5/1985 | Japan . |
| 61-97805 | 5/1986 | Japan . |
| 62-204428 | 9/1987 | Japan . |
| 1 583 256 | 1/1981 | United Kingdom . |

OTHER PUBLICATIONS

Journal of Magnetism and Magnetic Materials vol. 116, No. 1/2, Oct. 1992 pp. 147–153 Zhang Lin "A Study on the anisotrophy and coercivity of cobalt–surface–modified $\gamma-Fe_2O_3$ magentic particles".

Derwent Databse WPI Week 8637 AN 80–50468C & JP–A–55 072 009 May 1980 Abstract.

*Primary Examiner*—C. Melissa Koslow
*Attorney, Agent, or Firm*—Nixon & Vanderhye

[57] ABSTRACT

Disclosure describes a cobalt-containing iron oxide pigments comprising:

a cobalt-containing iron oxide core, the average concentration of cobalt distributed evenly in an innermost 50% by weight of the cobalt-containing iron oxide core being from 0.1 to 1.0% by weight (calculated as Co) based on iron oxide contained therein, and the content of $Fe^{2+}$ in the core being from 16 to 22% by weight based on the iron oxide contained in the cobalt-containing iron oxide core; and a cobalt-containing iron oxide surface layer, the average concentration of cobalt in the surface layer of the outermost 10% by weight of the pigment being on average at least five times as high as the average concentration of cobalt in the innermost 50% by weight of the cobalt-containing iron oxide core.

9 Claims, 1 Drawing Sheet

COBALT-CONTAINING IRON OXIDE PIGMENTS, PROCESS FOR PRODUCING THE SAME AND MAGNETIC RECORDING MEDIUM CONTAINING THE SAME

BACKGROUND OF THE INVENTION

The present invention relates to cobalt-containing iron oxide pigments, a process for producing the pigments and a magnetic recording medium containing the pigments. More in particular, it relates to cobalt-containing iron oxide pigments having a high coercive force, an excellent S.F.D. (Switching Field Distribution), and small temperature- and time-dependence (an excellent temperature stability and an excellent stability independent on the time) of the coercive force, a process for producing the pigments, and a magnetic recording medium containing the pigments with extremely small print through (extremely small deterioration with passage of time upon transfer) and extremely small long-term erasability (extremely small deterioration with passage of time upon erasure).

Known processes for producing iron oxides having a high coercive force in the prior art comprise essentially a modification of iron oxides with cobalt. The processes can be generally classified into two groups. Namely, a method of mass doping of an iron oxide (so-called doping method) and a method of coating on the surface of the iron oxide (so-called epitaxial method or coating method).

Surface-coating iron oxide pigments are advantageous, for example, in that they are free from deterioration with passage of time upon transfer and deterioration with passage of time upon erasure, excellent in magnetic stability, and of small temperature-dependence and time-dependence of the coercive force. However, in order to obtain a high coercive force, since a large amount of cobalt coated on the surface of iron oxide is required, cobalt costs are high and the resultant coercive force is relatively small as compared with the amount of cobalt used, which is economically disadvantageous.

In DE-A 2,235,383, iron oxide is epitaxially coated with cobalt to obtain a coercive force yield of about 4.5 kA/m·Co wt %. The coercive force yield is calculated as: coercive force yield=(Hc−27.8)/Co wt %. In this case, 27.8 kA/m as the coercive strength of the analogously Co-free iron oxide is subtracted as compensation. Further, coercive force yields of 9.9, 6.6, 9.5, 5.3 or 6.7 kA/m·Co wt % are obtained by calculation for analogously epitaxially coated products described in most preferred examples in DE-A 2,629,931, DE-A 2,639,259, DE-A 3,017,525, DE-A 3,017,652 and DE-A 3,101,834. According to other methods as described in DE-A 3,631,194 and DE-A 3,843,348, coercive force yields of 9–12 kA/m.Co wt % are obtained.

Generally, the doping method for the iron oxide has a higher coercive force yield. According to the method as disclosed in DE-A 2,252,564, when $\gamma$-$Fe_2O_3$ or $Fe_3O_4$ is mixed and stirred with an aqueous solution containing cobalt, filtered, washed with water, heated to 250 to 600° C. and then gradually cooled to 100° C. at a rate not more than 10° C./Hr, a coercive force yield as high as 12–16 kA/m.Co wt % is obtained. The effect of the gradual (slow) cooling can also be explained in the context of the distribution of cobalt in a tetrahedral or octahedral site in a spinel lattice (J. Appl. Phys., 1968, Vol. 39, No. 2, page 1204).

Also, a cobalt-doping method which does not use the gradual cooling effect, is also known from DE-A 2,308,791, DE-A 2,413,430 and U.S. Pat. No. 4,224,175. In these cases, a coercive force yields of 12.9, 14.6 and 16.7 kA/m·Co wt % at the maximum are obtained. In a modern method similar to that described in DE-A 2,903,592, a coercive force yield of about 20 kA/m.Co wt % is attained.

In addition, magnetic iron oxide particles having an excellent magnetic stability such as thermal stability of magnetic properties and comprising cobalt or cobalt and ferric oxide coated on the surface of cobalt-containing iron oxide particles having an excellent thermal stability of magnetic properties, are also known. For instance, Japanese Patent Application Laid-Open (KOKAI) No. 60-93629 proposes magnetic iron oxide particles in which a coating layer composed of a cobalt-containing iron oxide with a cobalt content of not less than 15% by weight based on iron, is formed integrally to the surface of a cobalt-containing iron oxide ($\gamma$-$Fe_2O_3$) crystal with a cobalt content of not more than 5% by weight based on iron [for example, cobalt content (Co/Co-$\gamma$-$Fe_2O_3$) in examples are 2.464% by weight and 3.64% by weight]. Japanese Patent Application Laid-Open (KOKAI) No. 55-72009 proposes a process for producing magnetic iron oxide particles, which comprises mixing cobalt-containing iron oxide particles with a cobalt salt in an alkali solution, heating the resultant mixture, and depositing a cobalt compound on the surface of the cobalt-containing iron oxide particles.

When cobalt is uniformly doped to a magnetic iron oxide particle, a high coercive force and an excellent S.F.D. can be attained easily. The tendency that the coercive force becomes higher is more conspicuous as the amount of the cobalt is increased. Therefore, the cobalt-containing iron oxide pigment prepared by the Co-doping method is obtainable at a lower cost than that obtained by the Co-coating method. However, as the amount of cobalt increases, it result in a drawback that the magnetic stability is worsened (demagnetization under pressurization and demagnetization under heating arise), the print through (deterioration with passage of time upon transfer) and long-term erasability (deterioration with passage of time upon erasure) arise, and the temperature stability and the stability independent on the time of coercive force is deteriorated.

When cobalt or cobalt and ferric oxide is coated on the surface of a magnetic iron oxide particle, although the print through (deterioration with passage of time upon transfer) and long-term erasability (deterioration with passage of time upon erasure) do not arise, and the temperature stability and stability independent on the time of the coercive force are excellent, it becomes difficult to obtain a high coercive force or an excellent S.F.D.

As a result of the present inventors' studies, it has been found that by integrally forming as a surface layer, a coating layer composed of a cobalt-containing iron oxide having a specific average Co concentration, for instance, at least 5 times as high as the average Co concentration of a berthollide core particle, on the surface of the berthollide core particle in which an extremely small average Co concentration, for instance, 0.1 to 1.0% by weight (calculated as Co) based on an iron oxide in the core particle is distributed evenly and in which the $Fe^{2+}$ content is from 16 to 22% by weight based on the iron oxide contained in the core particle, the obtained cobalt-containing iron oxide pigments have a high coercive force, an excellent S.F.D., and small temperature- and time-dependence (an excellent temperature stability and an excellent stability independent on the time) of the coercive force. On the basis of the finding, the present invention has been attained.

SUMMARY OF THE INVENTION

An object of the present invention is to provide a cobalt-containing iron oxide pigment of a lower cobalt content, having improved magnetic properties, particularly, a high coercive force.

Another object of the present invention is to provide a cobalt-containing iron oxide pigment having well-balanced properties of an increased coercive force yield, an excellent in S.F.D., a high magnetic stability (extremely small demagnetization under pressurization and demagnetization under heating), extremely good print through and long-term erasability (extremely small deterioration with passage of time upon transfer and deterioration with passage of time upon erasure), and excellent temperature stability and stability independent on the time of coercive force.

To accomplished the aims, in a first aspect of the present invention, there is provided cobalt-containing iron oxide pigments comprising:

a cobalt-containing iron oxide core, the average concentration of cobalt distributed evenly in an innermost 50% by weight of the cobalt-containing iron oxide core being from 0.1 to 1.0% by weight (calculated as Co) based on iron oxide contained therein, and the content of $Fe^{2+}$ in the core being from 16 to 22% by weight based on the iron oxide contained in the cobalt-containing iron oxide core; and a cobalt-containing iron oxide surface layer, the average concentration of cobalt in the surface layer of an outermost 10% by weight of the pigment being on average at least five times as high as the average concentration of cobalt in the innermost 50% by weight of the cobalt-containing iron oxide core.

In a second aspect of the present invention, there is provided a process for producing cobalt-containing iron oxide pigments as defined in the first aspect, comprising subjecting a cobalt-containing berthollide in which the evenly distributed cobalt average concentration is 0.1 to 1.0% by weight (calculated as Co) based on iron oxide contained therein, to coating-treatment with a cobalt compound or a cobalt compound and an iron compound in an aqueous phase.

In a third aspect of the present invention, there is provided a magnetic recording medium containing pigments as defined in the first aspect.

DETAILED DESCRIPTION OF THE INVENTION

Figure 1:
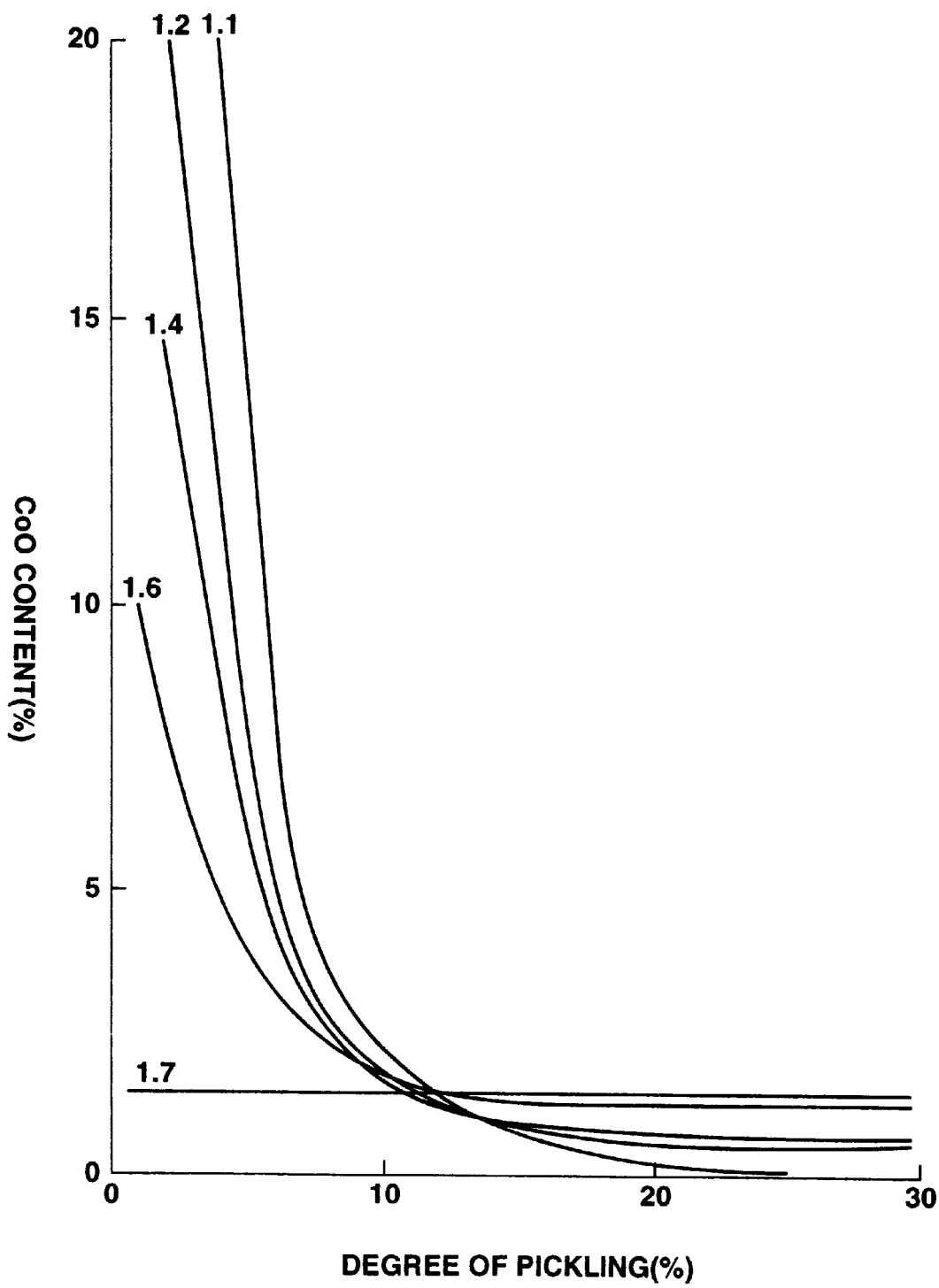
FIG. 1 shows the relationship of the degree of pickling and CoO content.

The cobalt-containing iron oxide pigments according to the present invention can be obtained economically at a low cost due to the low cobalt content in a core region (core) in the same manner as that produced by the doping method described above. Together with the economical merit, they also have characteristics of a high coercive force and an excellent S.F.D. attributable to the doping method, and characteristics of a good long-term erasability (small deterioration with passage of time upon erasure), a good print through (small deterioration with passage of time upon transfer), an excellent temperature stability of coercive force and an excellent stability independent on the time of the coercive force attributable to the surface coating method, in combination.

The average concentration of cobalt distributed uniformly in an innermost 50% by weight of the cobalt-containing iron oxide core is from 0.1 to 1.0% by weight, preferably from 0.2 to 0.8% by weight, particularly preferably from 0.3 to 0.8% by weight (calculated as Co) based on the iron oxide contained in the innermost 50% by weight of the cobalt-containing iron oxide core. If the average concentration of cobalt in the core exceeds 1.0% by weight (calculated as Co), the magnetic stability may be deteriorated (demagnetization under pressurization and demagnetization under heating may arise), the deterioration with passage of time upon transfer and deterioration with passage of time upon erasure may arise and the temperature stability and stability independent on the time of the coercive force tend to be reduced. On the contrary, if it is less than 0.1% by weight (calculated as Co), it is difficult to obtain a high coercive force yield and an excellent S.F.D.

The cobalt-containing iron oxide core is composed of a berthollide, and the content of $Fe^{2+}$ in the core is from 16 to 22% by weight, preferably 17 to 21% by weight based on the iron oxide contained in the cobalt-containing iron oxide core. If the content of $Fe^{2+}$ in the core is less than 16% by weight or it exceeds 22% by weight, it is difficult to obtain a high coercive force, a high coercive force yield and an excellent S.F.D. Cobalt-containing berthollide as the core is represented by the general formula (1):

$$Co_a Fe^{2+}{}_b Fe^{3+}{}_{(2+\frac{2}{3}\times(1-a-b))}O_4 \qquad (1)$$

wherein $0.00382 < a < 0.0392$, and $0.6448 < b < 0.9087$.

The average concentration cobalt in the surface layer of an outermost 10% by weight of the pigment in average, is at least five times, preferably 8 to 150 times, more preferably 10 to 100 times the average cobalt concentration in the innermost 50% by weight of the cobalt-containing iron oxide core. If the average concentration of cobalt in the surface layer is less than five times the average cobalt concentration in the innermost 50% by weight of the cobalt-containing iron oxide core, magnetic stability may be worsened (demagnetization under pressurization and demagnetization under heating may arise), the deterioration with passage of time upon transfer and deterioration with passage of time upon erasure may arise, and the temperature stability and the stability independent on the time of the coercive force tend to be lowered.

The core and/or surface layer of the cobalt-containing iron oxide pigment according to the present invention can contain at least one of elements selected from the group consisting of Si, Al, P, Zn, Mg, Mn, Ca, Sr, Ti, Cr and B.

A method of analyzing the cobalt distribution in the cobalt-containing iron oxide pigments according to the present invention will be shown below.

(1) About 50 g of exactly weighted pigments (hereafter referred to as "initial weight") are added into about 800 ml of distilled water and well dispersed with a mixing siren.

(2) The slurry concentration of the obtained suspension is determined.

(3) The resultant suspension is heated to 60° C. and subsequently proceeded under forceful stirring.

(4) To the suspension, the sulfuric acid having a prescribed normality and the resultant suspension is stirred so as to obtain a desired degree of pickling (For this, preliminary experiments are necessary for evaluating the respective pickle behaviors of pigments. The degree of pickling is controlled by means of adding 1N-sulfuric acid while changing an amount added in the range of from several ml to several tens ml.)

(5) Subsequently, the obtained suspension is rapidly filtered by using a suction filter and then washed with distilled water. The filtrate is diluted to 1500 ml, and the total amount of Co, Fe(II), and iron [Fe(II) and Fe(III)] in the filtrate is determined by means of atomic absorption spectrometry, I.C.P. (plasma analysis), chemical analysis, respectively. From the obtained values, the cobalt content contained in the surface layer of the Co-containing iron oxide pigment and the pickling degree of the Co-containing iron oxide pigment are calculated.

Namely, the average cobalt concentration in the surface layer of the Co-containing iron oxide pigment is denoted as a value which is a ratio of the obtained whole amount of cobalt from the above-mentioned analysis to the obtained conversion value of Co-containing iron oxide of the surface layer thereof (hereafter referred to as "conversion amount of Co-containing iron oxide in the surface layer") by inserting each obtained whole amount of Co, Fe(II) and Fe(III) in the filtrate into the formula (2) described later.

$$\begin{pmatrix} \text{Cobalt content} \\ \text{contained in the} \\ \text{surface layer} \end{pmatrix} = \begin{pmatrix} \text{Whole amount} \\ \text{of cobalt} \end{pmatrix} / \begin{pmatrix} \text{Conversion value} \\ \text{of Co-containing} \\ \text{iron oxide in the} \\ \text{surface layer} \end{pmatrix} \times 100$$

The degree of pickling is denoted as a value which is a ratio of the conversion value of Co-containing iron oxide in the surface layer to the initial weight of the pigments.

$$\begin{pmatrix} \text{Degree of} \\ \text{pickling} \end{pmatrix} = \begin{pmatrix} \text{Conversion value} \\ \text{of Co-containing} \\ \text{iron oxide in the} \\ \text{surface layer} \end{pmatrix} / \begin{pmatrix} \text{Initial} \\ \text{weight} \end{pmatrix} \times 100$$

(6) To the residual solid content of the pigments, the foregoing proceeding are repeated for determining a number of pickling degrees and the obtained values are plotted in FIG. 1. For obtaining a number of pickling degrees to have the cobalt distribution of from the surface of the particle to the inside thereof as shown in FIG. 1, a lot of experiments in which the normality of sulfuric acid is changed and the added amount of sulfuric acid is changed, are conducted.

The process for producing the cobalt-containing iron oxide pigment according to the present invention, comprises applying a coating treatment to cobalt-containing berthollide containing cobalt distributed evenly at average concentration of from 0.1 to 1.0% by weight (calculated as Co) based on the iron oxide contained therein, in an aqueous phase with a cobalt compound or a cobalt compound and a iron compound.

The core particles of cobalt-containing berthollide can be produced by a known method, particularly, by the method as described in DE-A 2,221,218 or DE-A 2,903,593. In this method a required amount of cobalt can be added prior to or during production of α-FeOOH or γ-FeOOH as a precursor. Alternatively, the required amount of cobalt may be added and precipitated on the precursor when α-FeOOH or γ-FeOOH is converted to a nucleus material (core material) represented by the formula (1):

$$Co_a Fe^{2+}{}_b \cdot Fe^{3+}{}_{(2+\frac{2}{3}\times(1-1-b))} O_4 \qquad (1)$$

wherein $0.00382 < a < 0.0392$, and $0.6448 < b < 0.9087$, by dehydrating α-FeOOH or γ-FeOOH under heating, reducing under heating and oxidizing under heating, and may be diffused in the core particle in the heat-treatment. At least one of elements selected from the group consisting of Si, Al, P, Zn, Mg, Mn, Ca, Sr, Ti, Cr and B, may be added prior to or during production of α-FeOOH or γ-FeOOH as a precursor. Also, at least one of elements selected from the group consisting of Si, Al, P, Zn, Mg, Mn, Ca, Sr, Ti, Cr and B, may be added to the produced α-FeOOH or γ-FeOOH as a precursor so as to coat the precursor therewith.

The cobalt surface-coating can be conducted by a known method. A method of adding an adequate cobalt salt or cobalt salt and ferrous salt after preliminary coating the surface with an iron hydroxide phase or without such preliminary coating, to precipitate cobalt or cobalt and Fe(II) is particularly preferred. During the preliminary coating, or during precipitation of cobalt or cobalt and Fe(II), the suspension is aged, preferably at an elevated temperature without using an oxidant or in the presence of an oxidant, particularly, under supply of air, thereby enabling to improve the physical property of the resultant product. However, the preliminary coating and the cobalt surface coating is applied in one or more step.

The preliminary coating and cobalt surface-coating for the core particles are applied by adding alkali, for example, sodium hydroxide or potassium hydroxide. The temperature of the heated suspension is from 70 to 100° C., preferably 90 to 98° C. Air is supplied at a rate of 0.3 to 3 liter/min in case of 5 liter reactor, for not more than 10 hrs, preferably from 0.5 to 8 hrs.

The composition of cobalt-containing iron oxide pigment obtained by the method as described above is represented by the general formula (2):

$$Co_{a'} Fe^{2+}{}_{b'} \cdot Fe^{3+}{}_{(2+\frac{2}{3}\times(1-a'-b'))} O_4 \qquad (2)$$

wherein $0.0189 \leq a' \leq 0.1974$, and $0.498 \leq b' \leq 0.834$.

The magnetic recording medium according to the present invention is obtained by applying a coating composition containing the cobalt-containing iron oxide pigment and a binder resin on a support. The amount of the cobalt-containing iron oxide pigment in the thus formed magnetic recording layer is from 50 to 85% by weight, preferably 60 to 85% by weight. Lubricant, polishing agent, antistatic agent or the like may be added to the magnetic recording layer. There is no particular restriction on the binder resin used herein so long as it is a resin generally used for the production of magnetic recording media.

The cobalt-containing iron-oxide pigments according to the present invention are pigments having a high coercive force, an excellent S.F.D., an excellent temperature stability and an excellent stability independent on the time of the coercive force. The magnetic recording medium containing such pigments according to the present invention is a medium with extremely good print through (extremely small deterioration with passage of time upon transfer) and extremely small long-term erasability (extremely small deterioration with passage of time upon erasure).

As apparent from the foregoing, the cobalt-containing iron oxide pigments according to the present invention are magnetic pigments having well-balanced characteristics of a high coercive force, a high coercive force yield (for instance, coercive force yield: 11–20 kA/m.Co wt %), an excellent S.F.D., a high magnetic stability (extremely small demagnetization under pressurization and demagnetization under heating), extremely small deterioration with passage of time upon transfer and deterioration with passage of time upon erasure, and an excellent temperature stability and stability independent on the time of the coercive force.

EXAMPLES

In the following, the invention is illustrated on the basis of several examples without limiting the invention in any way.

Example 1

A acicular goethite containing Zn and P with a specific surface area from 45–50 m²/g which is produced according to the acid method under addition of Zn and phosphate (as described in DE-A 2 347 486) was coated by the addition and precipitation of Co hydroxides with the aid of NaOH and subsequent precipitation of phosphate in a pH range of about 7–8. After filtration and good washing and drying, the material was converted to the Co-containing ferrite with a FeO content of approximately 25 wt % [corresponds to 19.4% by weight (calculated as $Fe^{2+}$)] under pre-annealing at 720° C., reduction with hydrogen at 420° C., passivation at 300° C. under air/nitrogen, and, finally, post-annealing at 650° C. under nitrogen (as also described in DE-A 2 903 593).

Materials with different Co contents in the nucleus material produced in this manner serve as starting material in the following described examples.

Example 2

A number of different nucleus materials (see Table 1) were produced according to the process described in Example 1. These nuclei were coated with various amounts of Co considering the Co content in the nuclei (see Table 1). The employed coating method is described in the following.

400 g of the nucleus material were dispersed in 2,000 ml of distilled water, ground in a corundum disc mill, and placed into a closed stirrable 5 liter ground glass jar. The suspension was supplied with enough NaOH in order to precipitate the later added amount of Co and to adjust the $OH^-$ concentration in the final suspension to 2 moles/liter. The volume of the suspension was increased to 3.9 liter by the addition of distilled water, the temperature of the suspension was raised to 95° C., and the suspension was stirred for 60 minutes. Hereafter, the corresponding amount of Co in 100 ml of a $CoSO_4$ solution was added, stirred at this temperature for the stirring times given in Table 1, filtered, dispersed in distilled water, neutralized, filtered, washed, and carefully dried (40° C.). The properties of the products produced in this manner are to be taken from Table 2, the Co concentration in product from Table 3 and FIG. 1.

Example 3

The nucleus materials which were produced according to the process described in Example 1 and are provided with various amounts of Co (see Table 4) were coated with Co according to three different methods. These were the method described in Example 2 as well as two further methods described as follows:

Method 1 (Corresponding to DE-A 3 631 194)

400 g of the nucleus material were dispersed in 2,000 ml of distilled water, ground in a corundum disc mill, and placed into a closed stirrable 5 liter ground glass jar. Enough iron sulfate solution was added in order to set a Fe/Co ratio to 2 after the addition of Co. The suspension was supplied with enough NaOH in order to precipitate the added iron as well a the later added amount of Co and to adjust the $OH^-$ concentration in the final suspension to 2 moles/liter. Hereafter, the corresponding amount of Co in 100 ml of $CoSO_4$ was added over 5 minutes. The volume of the suspension was increased to 3.9 liter by the addition of distilled water, the resultant suspension was oxidized with air for 60 minutes, the temperature of the suspension was raised to 95° C., further oxidized for 4 hours, filtered, dispersed in distilled water, neutralized, filtered, washed, and carefully dried (40° C.).

Method 2 (Corresponding to U.S. Pat. No. 5,116,419)

400 g of the nucleus material were dispersed in 2,000 ml of distilled water, ground in a corundum disc mill, and placed into a closed stirrable 5 liter ground glass jar. Enough iron sulfate solution was added in order to set a Fe/Co ratio to 2 after both additions of Co. The suspension was supplied with enough NaOH in order to precipitate the added iron as well as the later added amount of Co and to adjust the $OH^-$ concentration in the final suspension to 2 moles/liter. Hereafter, the corresponding amount of Co, for example, less 0.7 wt %, in 50 ml of $CoSO_4$ was added over 5 minutes. The volume of the suspension was increased to 3.9 liter by the addition of distilled water, the resultant suspension was oxidized with air for 60 minutes, the temperature of the suspension was raised to 95° C., further oxidized for 2 hours, the gassing switched to nitrogen, further 0.7 wt % Co (in 50 ml solution) was added, stirred under nitrogen for 3 hours at 95° C., filtered, dispersed in distilled water, neutralized, filtered, washed, and carefully dried (40° C.).

The properties of the products are to be taken from Table 5.

TABLE 1

Properties of the nucleus materials as well as the Co coating by the experiments from Example 1.

| Nucleus Number | Hc (kA/m) | FeO (wt %) [$Fe^{2+}$ (wt %)] | Specific Surface Area (m²/g)* | Average Co concentration (wt %) | Co Amount Added (wt %) | Stirring Time (hrs) |
|---|---|---|---|---|---|---|
| 1.1 | 37.0 | 21.7 [16.9] | 25.5 | 0.0 | 2.7 | 8 |
| 1.2 | 40.8 | 22.5 [17.5] | 25.1 | 0.11 | 2.5 | 8 |
| 1.3 | 45.4 | 22.5 [17.5] | 26.3 | 0.33 | 2.0 | 4 |
| 1.4 | 46.6 | 23.6 [18.3] | 25.1 | 0.55 | 1.5 | 2 |
| 1.5 | 52.0 | 21.8 [16.9] | 26.3 | 0.75 | 1.0 | 1 |
| 1.6 | 53.6 | 22.9 [17.8] | 25.2 | 1.0 | 0.5 | 1 |
| 1.7 | 51.1 | 11.7 [9.1] | 27.3 | 1.4 | — | — |

*Determined according to the Nitrogen-1-Point-Method (DIN 66131)

TABLE 2

Properties of the products from the experiments from Example 2.

| Nucl. No. | HC (kA/m) | CO (wt %) | FeO (wt %) ($Fe^{2+}$ (wt %)] | BET (m²/g) | Hc/% Co (kA/ m % Co) | Br/BS | SFD | Er (dir) | 100 h |
|---|---|---|---|---|---|---|---|---|---|
| 1.1 | 52.1 | 2.0 | 20.8 [16.2] | 26 | 12.2 | 0.861 | 0.41 | 73.0 | 71.0 |
| 1.2 | 50.5 | 1.8 | 19.4 [15.1] | 26 | 12.6 | 0.782 | 0.34 | — | — |

TABLE 2-continued

Properties of the products from the experiments from Example 2.

| Nucl. No. | HC (kA/m) | CO (wt %) | FeO (wt %) [Fe²⁺ (wt %)] | BET (m²/g) | Hc/% Co (kA/m % Co) | Br/BS | SFD | Er (dir) | 100 h |
|---|---|---|---|---|---|---|---|---|---|
| 1.3 | 53.6 | 1.6 | 18.3 [14.2] | 27 | 16.2 | 0.869 | 0.29 | 72.5 | 68.5 |
| 1.4 | 55.2 | 1.6 | 19.4 [15.1] | 26 | 17.1 | 0.859 | 0.29 | — | — |
| 1.5 | 55.3 | 1.5 | 17.6 [13.7] | 27 | 18.3 | 0.870 | 0.27 | — | — |
| 1.6 | 55.3 | 1.4 | 18.3 [14.2] | 26 | 19.6 | 0.866 | 0.27 | — | — |
| 1.7 | 51.1 | 1.1 | 11.7 [9.1] | 27.3 | 21.2 | — | — | 71.0 | 64.5 |

(Note)
Er (dir): Initial erasure property
100 h: Erasure property after 100 hours

TABLE 3

Co distribution of the products from Table 2.

| Nucleus No. | | Pickling Processes | | | | | | |
|---|---|---|---|---|---|---|---|---|
| | | 1. | 2. | 3. | 4. | 5. | 6. | 7. |
| 1.1 | D. of P. | 2.91 | 1.30 | 2.18 | 9.74 | 13.7 | — | — |
| | CoO # | 82.5 | 24.5 | 6.26 | 0.84 | 0.17 | — | — |
| 1.2 | D. of P. | 1.18 | 1.19 | 1.26 | 1.77 | 4.65 | 12.5 | 25.4 |
| | CoO # | 93.9 | 26.9 | 17.2 | 10.9 | 3.17 | 0.95 | 0.71 |
| 1.4 | D. of P. | 1.28 | 0.89 | 0.92 | 1.73 | 5.08 | 13.2 | 25.3 |
| | CoO # | 71.8 | 14.7 | 13.3 | 9.62 | 3.26 | 0.98 | 0.84 |
| 1.6 | D. of P. | 1.01 | 0.59 | 0.73 | 1.53 | 4.69 | 12.2 | 24.5 |
| | CoO # | 32.0 | 8.41 | 7.98 | 6.6 | 3.27 | 1.44 | 1.42 |
| 1.7 | D. of P. | 5.3 | 1.5 | 2.7 | 7.9 | 29.7 | — | — |
| | CoO # | 1.39 | 1.69 | 1.30 | 1.56 | 1.39 | — | — |

| Nucleus No. | Average Co concentration in the surface layer** (wt %) | Res.¹⁾ | Res.²⁾ | Co-En. Factor* |
|---|---|---|---|---|
| 1.1 | 21.8 | 68.9 | <0.01 | >2760 |
| 1.2 | 15.8 | 52.0 | 0.30 | 66 |
| 1.4 | 12.0 | 52.6 | 0.86 | 17.6 |
| 1.6 | 6.3 | 55.1 | 1.40 | 5.7 |
| 1.7 | 1.1 | 53 | 1.27 | 1.11 |

(Note)
Co-En. Factor* = Co enrichment factor = (Co content in the first 10% of the surface/Co content in the particle nucleus).
D. of P. = Degree of pickling (%)
CoO # = Average CoO concentration (wt %) in the each degree of pickling.
Res.¹⁾ = Residual content of iron oxide (wt %) after pickling Co-containing iron oxide in each pickling process.
Res.²⁾ = Residual average Co concentration (wt %) after pickling Co-containing iron oxide in each pickling process (corresponding to average Co-concentration in the core particle).
Average Co concentration in surface layer** = Average Co concentration in the surface layer of an outermost 10% by weight of the pigment

TABLE 4

Properties of the nucleus material from Example 3.

| Nucleus Number | HC (kA/m) | FeO (wt %) | Fe²⁺ (wt %) | BET (m²/q) | Average Co concentration (wt %) |
|---|---|---|---|---|---|
| 2.1 | 36.0 | 22.0 | 17.1 | 26 | 0.0 |
| 2.2 | 40.6 | 24.3 | 18.9 | 26 | 0.27 |
| 2.3 | 42.6 | 25.5 | 19.8 | 26 | 0.46 |
| 2.4 | 46.6 | 24.8 | 19.3 | 26 | 0.67 |

TABLE 5

Properties of the products from the experiments from Example 3.

| Ex. No. | Nucl. No. | Hc (kA/m) | Co (wt %) | FeO (wt %) | Fe²⁺ (wt %) | BET (m²/g) |
|---|---|---|---|---|---|---|
| 3.1 | 2.1 | 51.3 | 2.4 | 17.3 | 13.4 | 26 |
| 3.2 | 2.2 | 54.9 | 2.4 | 19.5 | 15.2 | 27 |
| 3.3 | 2.3 | 58.5 | 2.2 | 20.0 | 15.5 | 27 |
| 3.4 | 2.4 | 60.9 | 2.0 | 18.5 | 14.4 | 26 |
| 3.5 | 2.1 | 56.1 | 2.0 | 19.9 | 15.5 | 25 |
| 3.6 | 2.2 | 59.3 | 2.1 | 20.7 | 16.1 | 27 |
| 3.7 | 2.3 | 63.3 | 1.9 | 19.8 | 15.4 | 28 |
| 3.8 | 2.4 | 59.3 | 1.7 | 18.1 | 14.1 | 29 |
| 3.9 | 2.1 | 56.5 | 2.1 | 20.3 | 15.8 | 26 |
| 3.10 | 2.2 | 57.6 | 2.0 | 22.0 | 17.1 | 27 |
| 3.11 | 2.3 | 57.6 | 1.9 | 20.9 | 16.2 | 28 |
| 3.12 | 2.4 | 55.3 | 1.6 | 20.4 | 15.9 | 28 |

| Ex. No. | Nucl. No. | Hc/% Co (kA/m % Co) | Br/Bs | SFD | Co-En. Factor* |
|---|---|---|---|---|---|
| 3.1 | 2.1 | 9.8 | 0.885 | 0.42 | 3200 |
| 3.2 | 2.2 | 11.3 | 0.90 | 0.35 | 47.2 |
| 3.3 | 2.3 | 13.9 | 0.89 | 0.36 | 29.6 |
| 3.4 | 2.4 | 16.5 | 0.865 | 0.33 | 19.0 |
| 3.5 | 2.1 | 14.2 | 0.89 | 0.44 | 2320 |
| 3.6 | 2.2 | 15 | 0.895 | 0.39 | 25.6 |
| 3.7 | 2.3 | 18.7 | 0.90 | 0.39 | 20.2 |
| 3.8 | 2.4 | 18.5 | 0.87 | 0.37 | 16.1 |
| 3.9 | 2.1 | 13.7 | 0.895 | 0.44 | 2950 |
| 3.10 | 2.2 | 14.9 | 0.90 | 0.39 | 28.7 |

TABLE 5-continued

Properties of the products from the experiments from Example 3.

| 3.11 | 2.3 | 15.7 | 0.89 | 0.35 | 23.1 |
| 3.12 | 2.4 | 17.2 | 0.88 | 0.33 | 14.4 |

(Note)
Experiments 3.1–3.4; Co coating as described in Example 2
Experiments 3.5–3.8: Co coating according to Method 1
Experiments 3.9–3.12: Co coating according to Method 2
Co-En. Factor* = (Average Co concentration in the first 10% of the surface/Co content in the particle nucleus)

| No. | | Pickling Processes | | | | | | |
| --- | --- | --- | --- | --- | --- | --- | --- | --- |
| | | 1. | 2. | 3. | 4. | 5. | 6. | 7. |
| 3.1 | D. of P. | 2.85 | 2.80 | 2.50 | 7.40 | 14.5 | — | — |
| | CoO # | 75.5 | 30.5 | 7.20 | 0.75 | 0.10 | — | — |
| 3.2 | D. of P. | 1.40 | 2.35 | 2.55 | 2.70 | 3.57 | 10.5 | 26.8 |
| | CoO # | 86.6 | 27.4 | 22.5 | 7.85 | 4.86 | 0.95 | 0.66 |
| 3.3 | D. of P. | 1.58 | 1.04 | 1.23 | 3.75 | 5.08 | 15.8 | 21.0 |
| | CoO # | 91.1 | 15.5 | 14.3 | 9.55 | 3.50 | 0.95 | 0.78 |
| 3.4 | D. of P. | 1.75 | 1.37 | 1.05 | 1.78 | 3.69 | 13.5 | 22.3 |
| | CoO # | 76.9 | 13.5 | 10.8 | 7.90 | 3.45 | 1.85 | 1.20 |
| 3.5 | D. of P. | 1.95 | 1.85 | 2.35 | 7.50 | 15.7 | — | — |
| | CoO # | 4.0 | 25.5 | 7.5 | 0.85 | 0.13 | — | — |
| 3.6 | D. of P. | 1.05 | 0.95 | 1.75 | 2.56 | 4.85 | 13.5 | 23.0 |
| | CoO # | 65.4 | 19.8 | 15.8 | 9.55 | 3.80 | 0.75 | 0.68 |
| 3.7 | D. of P. | 1.00 | 1.35 | 1.75 | 2.56 | 4.85 | 13.5 | 23.0 |
| | CoO # | 64.4 | 17.8 | 12.8 | 8.55 | 3.80 | 0.75 | 0.68 |
| 3.8 | D. of P. | 1.25 | 1.45 | 1.85 | 2.45 | 2.75 | 8.53 | 27.4 |
| | CoO # | 60.9 | 16.8 | 9.84 | 6.58 | 3.55 | 1.15 | 1.01 |
| 3.9 | D. of P | 2.35 | 2.55 | 2.75 | 13.5 | 15.8 | — | — |
| | CoO # | 85.9 | 28.5 | 6.35 | 1.25 | 0.20 | — | — |
| 3.10 | D. of P. | 1.20 | 1.54 | 1.35 | 3.55 | 5.80 | 10.4 | 19.5 |
| | CoO # | 70.2 | 26.5 | 13.5 | 7.5 | 3.4 | 1.89 | 0.78 |
| 3.11 | D. of P. | 1.35 | 1.49 | 2.65 | 2.51 | 5.8 | 8.5 | 24.5 |
| | CoO # | 61.2 | 18.5 | 14.5 | 8.88 | 3.5 | 1.25 | 0.98 |
| 3.12 | D. of P | 1.16 | 1.35 | 2.54 | 3.55 | 3.85 | 7.65 | 24.5 |
| | CoO # | 61.9 | 17.8 | 7.75 | 5.80 | 3.54 | 1.08 | 1.01 |

| No. | Average Co concentration in surface layer** (wt %) | Res.[1] | Res.[2] | Co-En. Factor* |
| --- | --- | --- | --- | --- |
| 3.1 | 25.3 | 69.8 | <0.01 | 3200 |
| 3.2 | 21.3 | 50.1 | 0.57 | 47.2 |
| 3.3 | 17.5 | 50.5 | 0.75 | 29.6 |
| 3.4 | 15.0 | 55.0 | 1.01 | 29.0 |
| 3.5 | 18.3 | 69.0 | <0.01 | 2320 |
| 3.6 | 12.0 | 50.5 | 0.60 | 25.6 |
| 3.7 | 10.7 | 52.0 | 0.67 | 20.2 |
| 3.8 | 12.2 | 53.5 | 0.97 | 16.1 |
| 3.9 | 23.2 | 64.0 | <0.01 | 2950 |
| 3.10 | 14.1 | 56.5 | 0.62 | 28.7 |
| 3.11 | 14.1 | 52.8 | 0.77 | 23.1 |
| 3.12 | 11.1 | 55.0 | 0.98 | 14.4 |

(Note)
Co-En. Factor* = Co enrichment factor = (Co content in the first 10% of the surface/Co content in the particle nucleus).
D. of P. = Degree of pickling (%)
CoO # = Average CoO concentration (wt %) in the each degree of pickling.
Res.[1] = Residual content of iron oxide (wt %) after pickling Co-containing iron oxide in each pickling process.
Res.[2] = Residual average Co concentration (wt %) after pickling CO-containing iron oxide in each pickling process (corresponding to average Co-concentration in the core particle).
Average Co concentration in surface layer** = Average Co concentration in the surface layer of an outermost 10% by weight of the pigment

What is claimed is:

1. Cobalt-containing iron oxide pigments comprising:
   a cobalt-containing iron oxide core, the average concentration of cobalt distributed evenly in the innermost 50% by weight of the cobalt-containing iron oxide core being from 0.1 to 1.0% by weight (calculated as Co) based on iron oxide contained therein, and the content of $Fe^{2+}$ in the core being from 16 to 22% by weight based on the iron oxide contained in the cobalt-containing iron oxide core; and
   a cobalt-containing iron oxide surface layer, the average concentration of cobalt in the surface layer of the outermost 10% by weight of the pigment being on average at least five times as high as the average concentration of cobalt in the innermost 50% by weight of the cobalt-containing iron oxide core.

2. Cobalt-containing iron oxide pigment as defined in claim 1, wherein the average concentration of cobalt distributed evenly in the innermost 50% by weight of the cobalt-containing iron oxide core is from 0.2 to 0.8% by weight (calculated as Co).

3. Cobalt-containing iron oxide pigment as defined in claim 1, wherein the average concentration of cobalt in the surface layer is on average from 8 to 150 times as high as the average concentration of cobalt in the innermost 50% by weight of the cobalt-containing iron oxide core.

4. Cobalt-containing iron oxide pigment as defined in claim 1, wherein the core, the surface layer or both contain at least one of elements selected from the group consisting of Si, Al, P, Zn, Mg, Mn, Ca, Sr, Ti, Cr and B.

5. A process for producing cobalt-containing iron oxide pigments comprising
   a cobalt-containing iron oxide core, the average concentration of cobalt distributed evenly in the innermost 50% by weight of the cobalt-containing iron oxide core being from 0.1 to 1.0% by weight, calculated as Co, based on iron oxide contained therein, and the content of $Fe^{2+}$ in the core being from 16 to 22% by weight based on the iron oxide contained in the cobalt-containing iron oxide core; and
   a cobalt containing iron oxide surface layer, the average concentration of cobalt in the surface layer of the outermost 10% by weight of the pigment being on average at least five times as high as the average concentration of cobalt in the innermost 50% by weight of the cobalt-containing iron oxide core
   said process comprising the steps of coating a cobalt-containing berthollide in which the evenly distributed cobalt average concentration is 0.1 to 1.0% by weight, calculated as Co, based on the iron oxide contained therein, with a cobalt compound or a cobalt compound and an iron compound in an aqueous phase.

6. Cobalt-containing iron oxide pigment comprising
   a cobalt-containing iron oxide core, the average concentration of cobalt distributed evenly in the innermost 50% by weight of the cobalt-containing iron oxide core being from 0.1 to 1.0% by weight, calculated as Co, based on iron oxide contained therein, and the content of $Fe^{2+}$ in the core being from 16 to 22% by weight based on the iron oxide contained in the cobalt-containing iron oxide core; and
   a cobalt containing iron oxide surface layer, the average concentration of cobalt in the surface layer of the outermost 10% by weight of the pigment being on average at least five times as high as the average concentration of cobalt in the innermost 50% by weight of the cobalt-containing iron oxide core
   produced by a process comprising coating a cobalt-containing berthollide in which the evenly distributed cobalt average concentration is 0.1 to 1.0% by weight, calculated as Co, based on the iron oxide contained therein, with a cobalt compound or a cobalt compound and an iron compound in an aqueous phase.

7. A magnetic recording medium comprising a support and coated thereon a coating composition composed of cobalt-containing iron oxide pigments comprising a cobalt-containing iron oxide core, the average concentration of cobalt distributed evenly in the innermost 50% by weight of the cobalt-containing iron oxide core being from 0.1 to 1.0% by weight, calculated as Co, based on iron oxide contained therein, and the content of $Fe^{2+}$ in the core being from 16 to 22% by weight based on the iron oxide contained in the cobalt-containing iron oxide core;

a cobalt-containing iron oxide surface layer, the average concentration of cobalt in the surface layer of the outermost 10% by weight of the pigment being on average at least five times as high as the average concentration of cobalt in the innermost 50% by weight of the cobalt-containing iron oxide core; and a binder resin.

8. A cobalt-containing iron oxide pigment comprising a cobalt-containing iron oxide core, the average concentration of cobalt distributed evenly in the innermost 50% by weight of the cobalt-containing iron oxide core being from 0.1 to 1.0% by weight, calculated as Co, based on the iron oxide contained therein, and the content of $Fe^{2+}$ in the core being from 16 to 22% by weight based on the iron oxide contained in the cobalt-containing iron oxide core; and a cobalt-containing iron oxide surface layer, the average concentration of cobalt in the surface layer of the outermost 10% by weight of the pigment being on average at least five times as high as the average concentration of cobalt in the innermost 50% by weight of the cobalt-containing iron oxide core, wherein the core is represented by the formula:

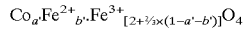

$$Co_{a'}Fe^{2+}{}_{b'}\cdot Fe^{3+}{}_{[2+\frac{2}{3}\times(1-a'-b')]}O_4$$

wherein $0.0189 \leq a' \leq 0.1974$, and $0.498 \leq b' \leq 0.834$.

9. A cobalt-containing iron oxide pigment comprising a cobalt-containing iron oxide core, the average concentration of cobalt distributed evenly in the innermost 50% by weight of the cobalt-containing iron oxide core being from 0.1 to 1.0% by weight, calculated as Co, based on iron oxide contained therein, and the content of $Fe^{2+}$ in the core being from 16 to 22% by weight based on the iron oxide contained in the cobalt-containing iron oxide core; and a cobalt-containing iron oxide surface layer, the average concentration of cobalt in the surface layer of the outermost 10% by weight of the pigment being on average at least five times as high as the average concentration of cobalt in the innermost 50% by weight of the cobalt-containing iron oxide core, wherein the cobalt-containing iron oxide core is represented by the formula:

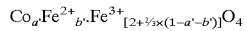

$$Co_{a'}Fe^{2+}{}_{b'}\cdot Fe^{3+}{}_{[2+\frac{2}{3}\times(1-a'-b')]}O_4$$

wherein $0.00382 < a < 0.0392$, and $0.6448 < b < 0.9087$.

* * * * *